United States Patent
Booss et al.

(10) Patent No.: US 11,442,778 B2
(45) Date of Patent: Sep. 13, 2022

(54) FAST SHUTDOWN OF LARGE SCALE-UP PROCESSES

(71) Applicant: SAP SE, Walldorf (DE)

(72) Inventors: Daniel Booss, Angelbachtal (DE); Robert Kettler, Heidelberg (DE)

(73) Assignee: SAP SE, Walldorf (DE)

( * ) Notice: Subject to any disclaimer, the term of this patent is extended or adjusted under 35 U.S.C. 154(b) by 303 days.

(21) Appl. No.: 15/930,041

(22) Filed: May 12, 2020

(65) Prior Publication Data

US 2021/0357261 A1  Nov. 18, 2021

(51) Int. Cl.
| | |
|---|---|
| *G06F 12/00* | (2006.01) |
| *G06F 9/50* | (2006.01) |
| *G06F 9/4401* | (2018.01) |
| *G06F 12/0882* | (2016.01) |
| *G06N 20/00* | (2019.01) |

(52) U.S. Cl.
CPC ............ *G06F 9/5016* (2013.01); *G06F 9/442* (2013.01); *G06F 9/4418* (2013.01); *G06F 9/5022* (2013.01); *G06F 12/0882* (2013.01); *G06N 20/00* (2019.01); *G06F 2209/5018* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2008/0189558 A1* | 8/2008 | Hughes | G06F 21/80 713/193 |
| 2016/0274799 A1* | 9/2016 | Gandolfi | G06F 3/0641 |
| 2019/0258580 A1* | 8/2019 | Booss | G06F 12/123 |

\* cited by examiner

*Primary Examiner* — Daniel D Tsui
(74) *Attorney, Agent, or Firm* — Mintz Levin Cohn Ferris Glovsky and Popeo, P.C.

(57) ABSTRACT

A system for shutting down a process of a database is provided. In some aspects, the system performs operations including tracking, during startup of a process, code locations of a process in the at least one memory. The operations may further include tracking, during runtime of the process and in response to the tracking the code locations, memory segments of the at least one memory allocated to the process. The operations may further include receiving an indication for a shutdown of a process. The operations may further include waking, in response to the indication, at least one processing thread of a plurality of processing threads allocated to a database system. The operations may further include allocating a list of memory mappings to the plurality of processing threads. The operations may further include freeing, by the first processing thread, the physical memory assigned to the processing thread by the memory mappings.

20 Claims, 4 Drawing Sheets

FAST SHUTDOWN OF LARGE SCALE-UP PROCESSES

TECHNICAL FIELD

The subject matter described herein relates generally to database processing and, more specifically, to fast shutdown of large scale-up processes in database systems.

BACKGROUND

A database may be configured to store a plurality of electronic data records. The database may be coupled with a database management system (DBMS) that supports a variety of database operations for accessing the data records held in the database including, for example, structured query language (SQL) queries and/or the like. The database may be stored in a cloud server.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include tracking, during a startup of a process, code locations of the process in the at least one memory. The operations may further include tracking, during runtime of the process and in response to the tracking the code locations, memory segments of the at least one memory allocated to the process. The operations may further include receiving an indication for a shutdown of a process. The operations may further include waking, in response to the indication, at least one processing thread of a plurality of processing threads allocated to a database system. The operations may further include allocating a list of memory mappings to the plurality of processing threads, the list of memory mappings comprising a subset of the memory segments allocated to the process, the subset assigned to a first processing thread of the plurality of processing threads. The operations may further include freeing, by the first processing thread, the physical memory assigned to the processing thread by the memory mappings. The operations may further include returning, after all processing threads finish freeing the physical memory assigned to the processing threads, control for shutting down the process to an operating system of the at least one data processor.

In some variations, one or more features disclosed herein including the following features may optionally be included in any feasible combination. For example, the tracking the code locations may include calling an operation to identify memory segments related to the code locations associated with the process. The freeing may be performed concurrently by each thread of the plurality of processing threads. The subset of memory may be based on a memory size. The allocating may include allocating particular memory segments to each thread of the plurality of processing threads. The freeing the physical memory may include freeing memory pages from a page table. The allocating may be based on the tracked memory segments. The allocating may be based on a machine learning model. The operations may further include updating the machine learning model based on a historic allocation of memory mappings to the plurality of processing threads. The allocating may be based on the updated machine learning model.

Implementations of the current subject matter may include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Large scale-up systems like databases tend to acquire a lot of resources and might cache them for future usage. In exceptional cases for example when unrecoverable errors occur, the process may need to be shut down immediately. The operating system may clean up all remaining resources as fast as possible to be able to reallocate them to other processes.

In some databases including in-memory databases and/or in-memory column-oriented relational database systems (e.g., SAP HANA) may involve a large quantity of computational and/or memory resources. A database shutdown process may consume a significant amount of time. For example, on a system having up to 48 TB of memory, the shutdown process may take up to approximately 68 minutes. This may increase the process downtime significantly. Next generation operating systems may increase the physical limit from 48 TB up to 4 PB of memory. This would imply that the database shutdown process may take up to 6144 minutes (e.g., over 4 days). The increased time consumption is due to the operating system freeing the resources using one thread only.

Implementations described herein relate to a process of shifting most of the processing work done during a process shutdown (e.g., a database process shutdown) to be accomplished with concurrent parallel processing threads before an operating system takes over the process shutdown. The shutdown processing work may be accomplished by a database process in parallel with multiple processing (e.g., CPU) threads rather than by the operating system using a single thread only. This parallel, concurrent processing across multiple processing threads may speed up the shutdown process significantly. Decisions on whether to shut down a process may be triggered by electronic signals, which may be transmitted and/or handled by the process itself before returning execution to the operating system. Concurrent clearing of physical memory described herein may reduce the time for process shutdown to more quickly free up memory for other processes and/or tasks.

Figure 1:
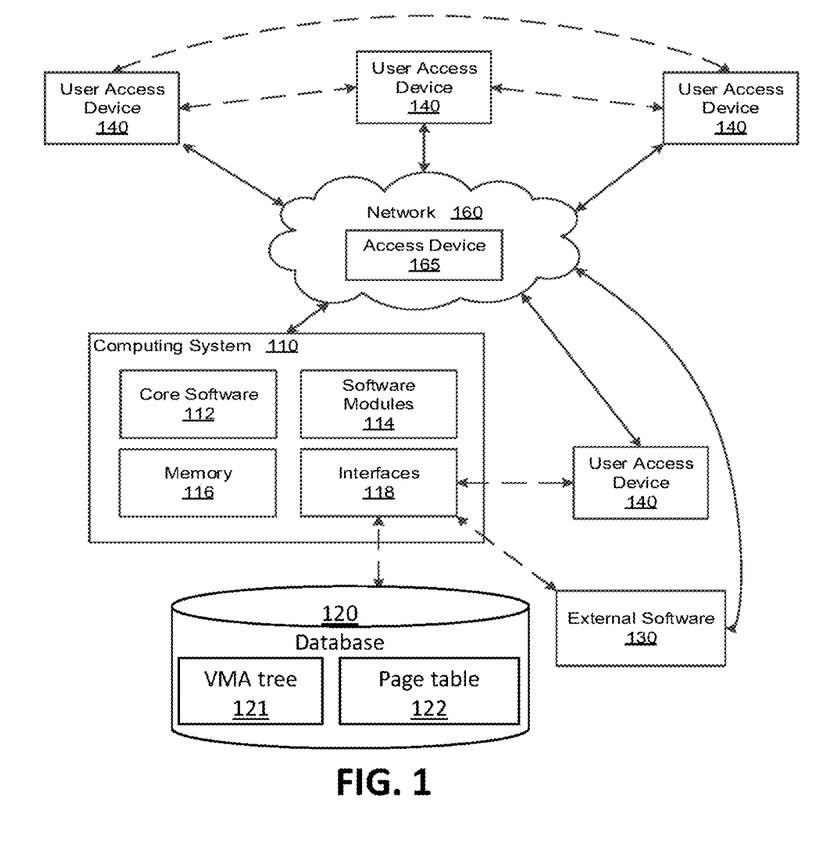
FIG. 1 depicts a functional block diagram of a system in which features consistent with the described subject matter may be implemented.

FIG. 1 illustrates a functional block diagram of a system 100 in which features consistent with the described subject matter may be implemented. As illustrated, the system 100 may include a computing system 110 capable of communicating with one or more user access devices 140. The computing system 110 may utilize one or more interfaces 118 for communication. Communication among the devices of the system 100 may be through the use of direct communications, such as through the use of a wireless connection like Bluetooth, near-field communication (NFC), Zig-Bee, and/or the like, and/or a wired connection such as universal serial bus (USB) and/or the like. Communication may additionally or alternatively occur through indirect communications, such as over a network 160 (e.g., a local area network, a wide area network, a wireless network, the Internet, or the like).

Communication over the network 160 may utilize a network access device 165, such as a base station, a Node B, an evolved Node B (eNB), an access nodes (ANs), a hotspot, and/or the like. Any of the user access device 140 may include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like.

As illustrated, the computing system 110 may include core software 112 and/or one or more software modules 114. The core software 112 may provide one or more features of a high-level programming software system. The software modules 114 may provide more specialized functionality. For example, the core software 112 and/or software modules 114 may include database management features, such as those described herein.

The core software 112 or other similar software/hardware may be capable of accessing a database layer, such as the database 120, which includes a page table 122 and virtual memory area (VMA) tree 121 to monitor memory (e.g., memory 116, a memory of the database 120, or the like). The VMA tree 121 may store metadata describing memory areas (e.g., a start address of memory, an end address of memory, a type of memory (stack, heap, library, etc.)) The page table 122 may store a mapping between virtual memory addresses and physical memory addresses and may point to physical memory pages that may store any type of data, including transactional data, metadata, timestamp data, lock data, access data, master data, company/business data, and/or the like. The computing system 110 may include a cloud server (not shown) storing table partitions.

One or more of the software modules 114 may be configured to utilize data stored in the memory 116, data stored in the database 120, and/or data otherwise accessible to the computing system 110. As further illustrated, the computing system 110 may be capable of utilizing external software 130. The external software 130 may provide additional functionalities or services, which may not be available at the computing system 110. The external software 130 may include cloud services. The computing system 110 may aggregate or otherwise provide a gateway via which users may access functionality provided the external software 130. The database 120 and/or the external software 130 may be located across one or more servers, and/or communication among the computing system 110, the database, and/or the external software 130 may occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. The database 120 may be a structured, organized collection of data, such as schemas, tables, queries, reports, views, and/or the like, which may be processed for information. The database 120 may be physically stored in a hardware server or across a plurality of hardware servers. The database 120 may include a row store database, a column-store database, a schema-less database, or any other type of database. The computing system 110 may be configured to perform OLTP (online transaction processing) and/or OLAP (online analytical processing), which may include complex analytics and tasks. Any of the data stored in the database 120 may additionally or alternatively be stored in the memory 116, which may be required in order to process the data. As noted, a large accumulation of table data stored in the database 120 may affect the performance and/or resources of the memory 116, the core software 112, and/or a processor of the computing system 110.

The core software 112 may be configured to load the information from the database 120 to memory 116 (e.g., main memory) in response to some event and/or determination. For example, data may be retrieved from the database 120 and/or loaded into the memory 116 based on receipt of a query instantiated by a user or computer system, which may occur through one or more user access device 140, external software 130, and/or the like. At least a portion of the data for the database 120 may reside in-memory (e.g., in random-access memory (RAM)), within the memory 116, for example. Data stored in-memory may be accessed faster than data stored in long term storage (also referred to herein as "on disk").

Although the database 120 may be illustrated as described as being separate from the computing system 110, in various implementations, at least a portion of the database 120 may be located within the memory 116 of the computing system 110.

The computing system 110 may implement procedures for cleaning and clearing memory for a process shutdown. After freeing physical memory (e.g., removing physical memory pages from the page table 122), the computing system 110 may receive feedback regarding whether the cleaning and clearing of memory was correct and/or resulted in an improved performance. Additionally, after freeing physical memory for the process shutdown, an operating system of the computing system may complete the cleanup process and re-allocate memory resources to other processes.

In order to avoid a memory shortage due to the shutdown process being unable to free memory resources quickly the computing system 110, may perform periodic checks to determine whether the database may be optimized by cleaning and clearing memory prior to shutdown of a process. For example, the computing system 110 may implement a log or protocol to determine a current memory size of the database, how often the memory of the database are accessed, and determine how they are used. The determining which memory resources to unload or clean up may be based on one or more parameters to indicate a location of memory resources and/or indicate that a loaded memory structure has not been accessed for a threshold time period and/or is not likely to be accessed within a threshold time period. The parameters may include the type of data, the size of data, a rate or quantity of out of memory (00M) errors, a last time when the data was accessed, a type of access to the data (e.g., read, write, etc.), and/or the like.

The computing system 110 may, during a startup of a process, track code locations of the process (e.g., libraries) in memory. For example, the computing system 110 may retrieve a list of memory segments related to code of the process. The computing system 110 may also distinguish between different types of access. Moreover, general housekeeping processes may not trigger loading unloaded tables, so costly reloads due to housekeeping processes may be avoided.

The computing system 110 may distinguish between different types of data structures. For example, the computing system 110 may distinguish between accessing and/or cleaning up the VMA tree 121 and/or the page table 122. For example, the computing system 110 may attempt to reduce (e.g., cleanup) the memory stored in the page table 122 and return the cleared memory resources to the operating system of the computing system 110.

As noted above, distinguishing between the types of access may enable the computing system 110 to more quickly free up physical memory for the process shutdown (e.g., memory from the page table 122) and re-assign the freed memory resources to other processes (e.g., VMA table 121).

Figure 2:
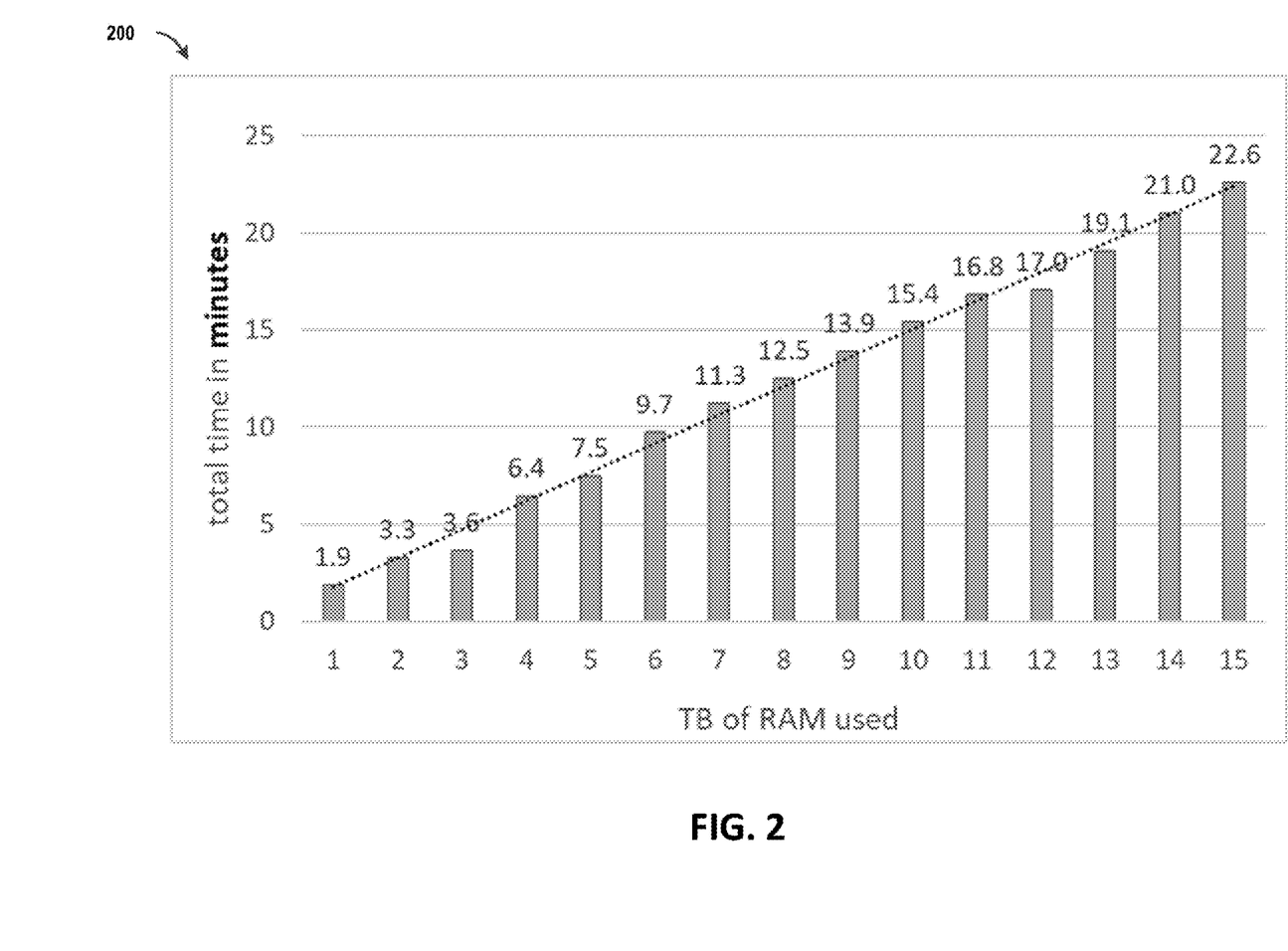
FIG. 2 depicts an example of a graph illustrating time consumption versus a memory size, in accordance with some example implementations.

FIG. 2 depicts an example graph 200 illustrating time consumption versus a memory size, in accordance with some example implementations. In the example of FIG. 2, the processing time for shutting down a process increases linearly with an increase in memory. This increase shown assumes the shutdown process is being executed by an operating system using a single processing thread. The larger time consumption shown at the right hand side of FIG. 2 may detrimentally affect system performance because system resources may be tied up in the shutdown process for an extended period of time and unable to be deployed elsewhere.

In order to combat the increase in time consumption, it may be beneficial to allocate the shutdown processing among multiple processing threads. For example, a database management system may be allocated memory (e.g., memory 116) and processing resources (e.g., core software 112) by an operating system of a computing system (e.g., computing system 110). The database management system (e.g., SAP HANA) may include central processing unit (CPU) threads for executing database processes. In some aspects, the CPU threads may be allocated by an operating system of the computing system 110. The threads may allow application logic and/or processes to be separated into several concurrent execution paths. This feature may be useful when complex applications and/or processes have many tasks that can be performed at the same time, as explained further below for the shutdown process.

Figure 3:
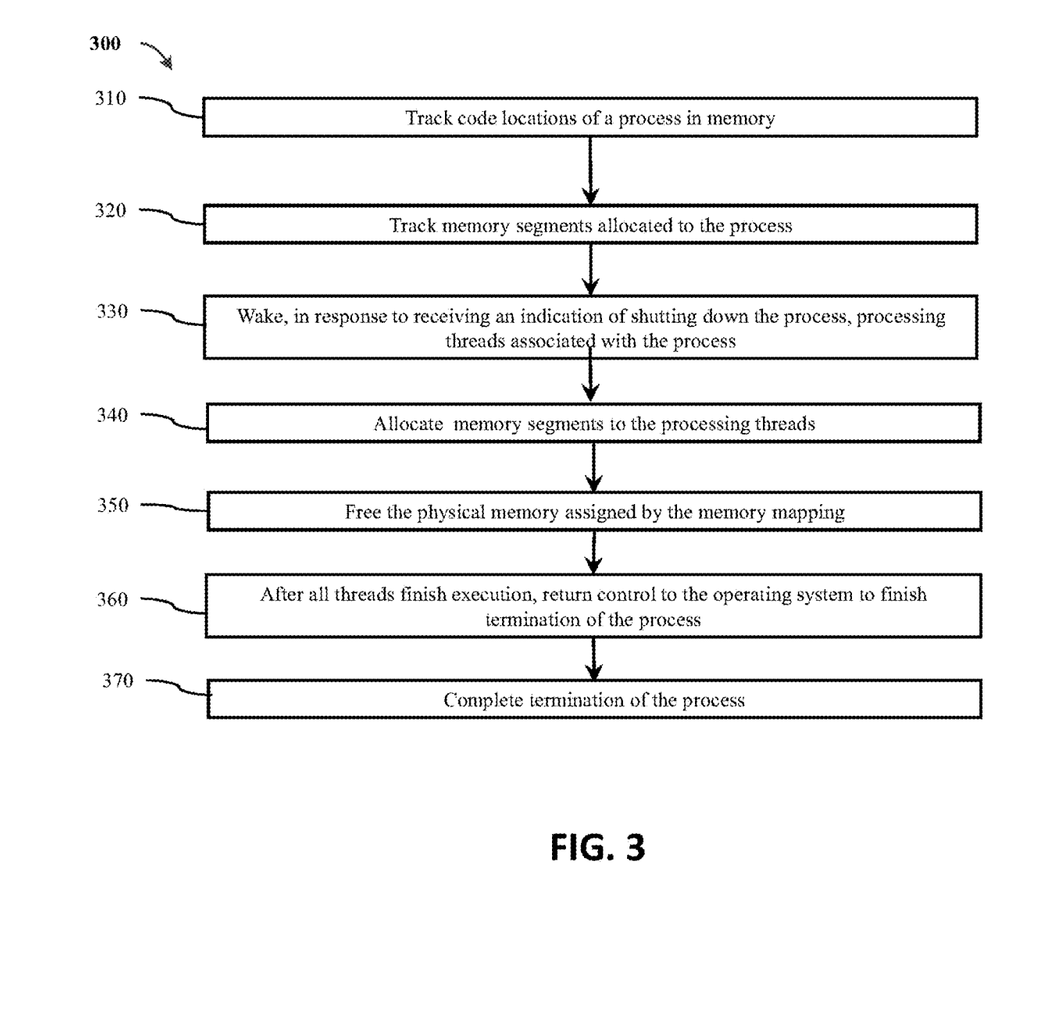
FIG. 3 depicts a flowchart illustrating a process for shutting down a process in a database management system, in accordance with some example implementations.
Figure 4:
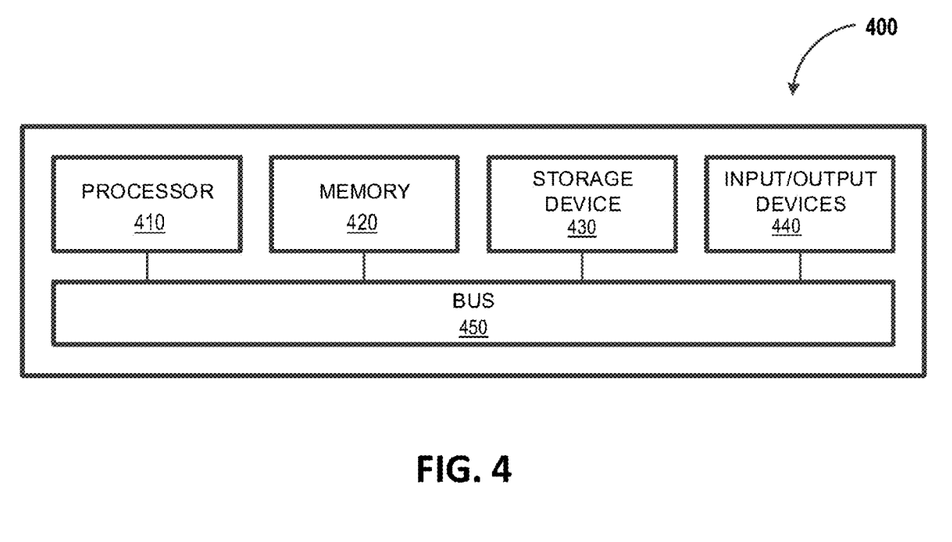
FIG. 4 depicts a block diagram illustrating a computing apparatus, in accordance with some example implementations.

FIG. 3 depicts a flowchart illustrating a process 300 for shutting down a process, in accordance with some example implementations. Referring to FIGS. 1 and 4, the process 300 may be performed by a computing apparatus such as, for example, the computing system 110, the user access device 140 and/or the access device 165, and/or the computing apparatus 400.

At operational block 310, the apparatus 400, for example, may, during a startup of a process, track the code locations of a process in memory. For example, the apparatus 400 may call an operation (e.g., Linux operation PROC/SELF/MAPS) to identify memory segments related to a location of code associated with the process such as the process of the database management system being terminated). It may be beneficial to identify code (e.g., code libraries, stack, heap, or the like), so that the code is not deleted during the shutdown, termination process.

At operational block 320, the apparatus 400, for example, may, during runtime of the process, track the memory segments allocated to the process. For example, in response to tracking the code locations in memory, the apparatus 400 may call an operation (e.g., the Linux operation PROC/SELF/MAPS) to identify memory segments attached or associated with the process. Tracking the memory segments allocated to the process may include identifying and/or monitoring a start address and an end address for the memory segments.

At operational block 330, the apparatus 400, for example, may, in response to receiving an indication of a shutting down the process, wake up processing threads associated with the process. For example, a quantity of threads may be allocated to the database management system for running one or more database processes. In order to fully utilize the allocated threads, the apparatus 400 may wake up any inactive threads so that they may be applied to the concurrent, parallel processing of the shutdown process. Waking up a thread may refer to making an inactive thread active. The shutdown of the process may be indicated using electronic signals, which may be handled by the process itself (e.g., the database management system process) before returning execution of the shutdown to the operating system. The electronic signals may be either sent from outside the process (e.g., a crash signal sent by the operating system) to terminate the process forcefully or sent from the process itself as a consequence of an attempt to access a memory address which does not refer to valid memory (e.g., physical memory may not be mapped at all at this address, memory may have wrong access rights such as only read rights but there is a write access or the memory address may not be well aligned but the assembler instruction requires appropriate alignment). In some aspects, only a subset of the allocated threads may be active and the remaining threads may be inactive.

At operational block 340, the apparatus 400, for example, may, during termination of the process, assign memory segments to a thread. During termination of the process, the threads of the process may work concurrently on returning memory to the OS. As described herein, termination of the process may be a regular shutdown (maintenance downtime, upgrade) or a crash (e.g., crash signal) or some other forceful termination.

During termination of the process, each thread of the process may be assigned which memory segments to return to the operating system. For example, a database management system (e.g., SAP HANA) may include 32 CPU threads for processing database processes and/or applications. The apparatus 400 may, in response to tracking the memory segments allocated to the process, split the assigned memory segments into different groups and apportion the groups to different threads. For example, the apparatus 400 may determine that memory segments 0-119 are allocated to the process. The apparatus 400 may then allocate 16 threads to memory segments 0-59, 8 threads to memory segments 60-89, and 8 threads to memory segments 90-119. Each thread may receive a memory mapping indicating which memory segment(s) a thread is responsible for clearing during the termination of the process. While specific assignments of memory segments to threads are described above, other assignments are possible.

In some aspects, rather than being assigned to specific memory segments, each group of threads may be allocated a particular memory size to free or clean up. In some aspects, assignments of memory to threads may use a round robin strategy. For example, the first 1 GB may be returned by thread 1, then a second 1 GB by thread 2, . . . , nth GB by thread n, or the like.

As noted with respect to block 330, if any of the 32 CPU threads were inactive prior to receiving the indication of the shutdown of the process, then those inactive threads may be woken up so that they are active to handle the processing indicated in the received memory assignments to the processing threads. While specific quantities of threads and memory segments are described herein, other quantities are possible.

At operational block 350, the apparatus 400, for example, may free the physical memory assigned to each thread by the memory mapping. For example, in response to receiving the memory mappings, each thread may communicate to the operating system to free the physical memory assigned to the thread via the memory mapping. For example the thread may call an operation (e.g., a madvise operation with an option madv_dontneed operation or madv_free operation on Linux) to free memory resources (e.g., memory pages of the page table 122) associated with the thread (e.g., via the assigned memory mapping). The madvise operation refers to a system call to give advice or directions to the kernel about the address range beginning at a certain address.

At operational block 360, the apparatus 400, for example, may, in response to completion of the freeing, return control to the operating system to finish termination of the process. For example, the freeing of memory resources by each thread may occur concurrently across the multiple threads (e.g., 32 threads). After all threads have finished freeing the assigned memory resources, execution of the termination process may be returned to the operating system (e.g., operating system of the computing system 110).

At operational block 370, the apparatus 400, for example, may, in response to the returning, may complete the termination of the process by the operating system. For example, the operating system of the computing system 110 may clean up all remaining memory resources as fast as possible to be able to re-assign them to other processes. As noted above, the operating system clean-up may be completed by a single processing thread.

FIG. 4 depicts a block diagram illustrating a computing apparatus 400 consistent with implementations of the current subject matter. Referring to FIGS. 1-3, at least a portion of the computing apparatus 400 may be used to implement at least a portion of the computing system 110, an apparatus providing the database 120, an apparatus providing the external software 130, one or more of the user access devices 140, an access device 165, the process 300 and/or the like.

As shown in FIG. 4, the computing apparatus 400 may include a processor 410, a memory 420, a storage device 430, and input/output devices 440. The processor 410, the memory 420, the storage device 430, and the input/output devices 440 may be interconnected via a system bus 450. The processor 410 may be capable of processing instructions for execution that may implement operations consistent with those described herein. Such executed instructions may be implement by one or more components of, for example, the computing system 110, the user access device 140 and/or the access device 165. In some example implementations, the processor 410 may be a single-threaded processor. Alternately, the processor 410 may be a multi-threaded processor. The processor 410 may be capable of processing instructions stored in the memory 420 and/or on the storage device 430 to display graphical information for a user interface provided via the input/output device 440.

The memory 420 may be a computer readable medium such as volatile or non-volatile that stores information within the computing apparatus 400. The memory 420 may store data structures representing configuration object databases, for example. The storage device 430 is capable of providing persistent storage for the computing apparatus 400. The storage device 430 may be a floppy disk device, a hard disk device, an optical disk device, or a tape device, or other suitable persistent storage means. The input/output device 440 provides input/output operations for the computing apparatus 400. In some example implementations, the input/output device 440 includes a keyboard and/or pointing device. In various implementations, the input/output device 440 includes a display unit for displaying graphical user interfaces. In some aspects, a visual display of one or more table aspects may be based on table size, table usage/lock history, for read and/or write functions, and table load status history. In some aspects, for each pass/period/run of a decision process described herein, one pixel may be reserved for each individual table. The color value of the pixel may be made up of the following table properties: 2 bits for actual read locking; 1 bit for write locking; 1 bit for the load status (loaded, unloaded); and some bits for the table size.

According to some example implementations, the input/output device 440 may provide input/output operations for a network device. For example, the input/output device 440 may include Ethernet ports or other networking ports to communicate with one or more wired and/or wireless networks (e.g., a local area network (LAN), a wide area network (WAN), the Internet). The input/output device 440 may include one or more antennas for communication over the network 160 with the computing system 110, the user access device 140 and/or the access device 165. Wireless networks may include Wi-Fi, WiMAX, and cellular networks (2G/3G/4G/5G), and/or any other wireless network.

In some example implementations, the computing apparatus 400 may be used to execute various interactive computer software applications that may be used for organization, analysis and/or storage of data in various formats. Alternatively, the computing apparatus 400 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 440. The user interface may be generated and presented to a user by the computing apparatus 400 (e.g., on a computer screen monitor, etc.).

In some implementations, a machine learning model of a machine learning system may evaluate the impact of allocating processes and/or applications among multiple threads. The model may assume that the future use of the allocated memory segments/resource is not significantly different from the old one. If so, then the algorithm may make more accurate allocation decisions for threads to clear physical memory. If the usage or performance changes significantly, further training may allow the algorithm to adapt to the changed usage and/or performance.

The machine learning system may comprise a neural network. The machine learning system may be trained in an unsupervised or supervised manner. In some implementations, for all considered allocations, the history of different aspects of memory usage, loading, unloaded and/or the like may be recorded. This history may include the load status of the memory, the increase difference of the processing performance, and the memory mapping decisions. The respective values may be retrieved periodically by a system process and recorded in the history on a rolling basis. From the load status history of the memory, loads and unloads of each memory resource may be retrieved. The machine learning system may be trained to distinguish between memory usage for business purposes and memory usage for housekeeping purposes. If the machine learning system indicates that a memory resource is only used by housekeeping processes it may factor that parameter in its decision to unload the table. As such memory resources may be unloaded less than housekeeping processes run and thus over all the system resources may beneficially be dedicated to business purpose processes than for housekeeping processes.

The machine learning system may group the loaded memory resources. The grouping may serve to limit the machine learning processing/training. The larger the set of memory resources the more complex the algorithm to be trained and the higher the expected efficiency. On the other hand, the complexity of the algorithm may increase the learning processing/training. For each group of memory resources, the machine learning system may apply an algorithm or model. The described history of the memory resources of a group may form the input of the algorithm. The output of the algorithm may be an unload decision for each memory resource and/or memory resource group.

Training the unload decision algorithm may involve using the different historical aspects of the memory resources. A decision to unload a memory resource may be compared with the time until the memory resource is reloaded again, such as to answer some query request. If that time is long, then that may indicate the decision was right. If the time to reload was short, then it may indicate that the decision was wrong. If the memory resource was not unloaded despite the fact that it was not used afterwards, then the machine learning system may determine that a decision not to unload was likely incorrect. In some aspects, it may be advantageous to reload memory resource(s) shortly before the first subsequent use after a meaningful unload. Reloading may shorten the query execution time of this first subsequence use by reducing the amount of data in the memory resources and the load time of the memory resource. For reloading a memory resource, the output level of the algorithm may include a load decision in addition to the unload decision.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   tracking, during a startup of a process, code locations of the process in the at least one memory;
   tracking, during runtime of the process and in response to the tracking the code locations, memory segments of the at least one memory allocated to the process;
   receiving an indication for a shutdown of a process;
   waking, in response to the indication, at least one processing thread of a plurality of processing threads allocated to a database system;
   allocating a list of memory mappings to the plurality of processing threads, the list of memory mappings comprising a subset of the memory segments allocated to the process, the subset assigned to a first processing thread of the plurality of processing threads;
   freeing, by the first processing thread, the physical memory assigned to the processing thread by the memory mappings; and
   returning, after all processing threads finish freeing the physical memory assigned to the processing threads, control for shutting down the process to an operating system of the at least one data processor.

2. The system of claim 1, wherein the tracking the code locations comprises calling an operation to identify memory segments related to the code locations associated with the process.

3. The system of claim 1, wherein the freeing is performed concurrently by each thread of the plurality of processing threads.

4. The system of claim 1, wherein the subset of memory is based on a memory size.

5. The system of claim 1, wherein the allocating comprises allocating particular memory segments to each thread of the plurality of processing threads.

6. The system of claim 1, wherein freeing the physical memory comprises freeing memory pages from a page table.

7. The system of claim 5, wherein the allocating is based on the tracked memory segments.

8. The system of claim 1, wherein the allocating is based on a machine learning model and wherein the operations further comprise:
   updating the machine learning model based on a historic allocation of memory mappings to the plurality of processing threads.

9. The system of claim 8, wherein the allocating is based on the updated machine learning model.

10. The system of claim 1, wherein freeing the physical memory comprises calling a madvise operation.

11. A method comprising:
    tracking, by at least one processor during a startup of a process, code locations of the process in a memory;
    tracking, by the at least one processor during runtime of the process and in response to the tracking the code locations, memory segments allocated to the process;
    receiving, by the at least one processor, an indication for a shutdown of a process;
    waking, by the at least one processor and in response to the indication, at least one processing thread of a plurality of processing threads allocated to a database system;
    allocating, by the at least one processor, a list of memory mappings to the plurality of processing threads, the list of memory mappings comprising a subset of the memory segments allocated to the process, the subset assigned to a first processing thread of the plurality of processing threads;
    freeing, by the first processing thread, the physical memory assigned to the processing thread by the memory mappings; and
    returning, by the at least one processor and after all processing threads finish freeing the physical memory assigned to the processing threads, control for shutting down the process to an operating system of the at least one data processor.

12. The method of claim 11, wherein the tracking the code locations comprises calling an operation to identify memory segments related to the code locations associated with the process.

13. The method of claim 11, wherein the freeing is performed concurrently by each thread of the plurality of processing threads.

14. The method of claim 11, wherein the subset of memory is based on a memory size.

15. The method of claim 11, wherein the allocating comprises allocating particular memory segments to each thread of the plurality of processing threads.

16. The method of claim 11, wherein freeing the physical memory comprises freeing memory pages from a page table.

17. The method of claim 11, wherein the allocating is based on the tracked memory segments.

18. The method of claim 11, wherein the allocating is based on a machine learning model and wherein the method further comprises:
updating, by the at least one processor, the machine learning model based on a historic allocation of memory mappings to the plurality of processing threads.

19. The method of claim 18, wherein the allocating is based on the updated machine learning model.

20. A non-transitory computer readable medium storing instructions which, when executed by at least one processor, cause operations comprising:
tracking, during startup of a process, code locations of a process in the at least one memory;
tracking, during runtime of the process and in response to the tracking the code locations, memory segments of the at least one memory allocated to the process;
receiving an indication for a shutdown of a process;
waking, in response to the indication, at least one processing thread of a plurality of processing threads allocated to a database system;
allocating a list of memory mappings to the plurality of processing threads, the list of memory mappings comprising a subset of the memory segments allocated to the process, the subset assigned to a first processing thread of the plurality of processing threads;
freeing, by the first processing thread, the physical memory assigned to the processing thread by the memory mappings; and
returning, after all processing threads finish freeing the physical memory assigned to the processing threads, control for shutting down the process to an operating system of the at least one data processor.

* * * * *